United States Patent
Shu et al.

(10) Patent No.: US 10,738,403 B2
(45) Date of Patent: Aug. 11, 2020

(54) METHOD FOR MONITORING WATER CONSUMPTION OF WASHING MACHINE, WASHING MACHINE, AND WASHING MACHINE SYSTEM

(71) Applicant: QINGDAO HAIER WASHING MACHINE CO., LTD., Shandong (CN)

(72) Inventors: Hai Shu, Shandong (CN); Junming Yin, Shandong (CN); Zhenxing Huang, Shandong (CN); Sheng Xu, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 196 days.

(21) Appl. No.: 16/075,049

(22) PCT Filed: Jan. 23, 2017

(86) PCT No.: PCT/CN2017/072139
§ 371 (c)(1),
(2) Date: Aug. 2, 2018

(87) PCT Pub. No.: WO2017/133528
PCT Pub. Date: Aug. 10, 2017

(65) Prior Publication Data
US 2019/0040564 A1 Feb. 7, 2019

(30) Foreign Application Priority Data
Feb. 3, 2016 (CN) .......................... 2016 1 0076300

(51) Int. Cl.
*D06F 33/02* (2006.01)
*D06F 33/46* (2020.01)
(Continued)

(52) U.S. Cl.
CPC .............. *D06F 33/00* (2013.01); *D06F 33/46* (2020.02); *D06F 39/087* (2013.01);
(Continued)

(58) Field of Classification Search
CPC ........ D06F 33/00; D06F 33/46; D06F 39/087; D06F 2202/02; D06F 2202/08; D06F 2204/086; D06F 2210/00; D06F 2212/02
See application file for complete search history.

(56) References Cited

U.S. PATENT DOCUMENTS

| 4,777,683 A | * | 10/1988 | Pellerin | ................. D06F 39/087 68/12.19 |
| 2005/0049756 A1 | * | 3/2005 | Bolduan | ................. D06F 33/00 700/282 |

(Continued)

FOREIGN PATENT DOCUMENTS

| CN | 105040352 A | 11/2015 |
| CN | 105177919 A | 12/2015 |
| EP | 2628846 A1 | 8/2013 |

OTHER PUBLICATIONS

Machine translation of CN 105040352 A to Wuxi Little Swan Co, Ltd. (Year: 2015).*

(Continued)

*Primary Examiner* — Joseph L. Perrin
(74) *Attorney, Agent, or Firm* — Buchanan Ingersoll & Rooney PC (57) ABSTRACT

A method for monitoring water consumption of a washing machine, comprising: the washing machine executing a clothes washing procedure and receiving a water level setting instruction; the washing machine executing the clothes washing procedure and acquiring opening time t of a water intake valve from start to end; the washing machine calculating the water intake flow of the water intake valve Q=Q0+ΔQ, and calculating the water consumption W=Qt;

(Continued)

wherein with a normal water pressure and no load, when the water intake of the washing machine reaches the level, the theoretical flow value is Q0, the theoretical water intake time is t0, ΔQ is a flow correction value, ΔQ is calculated from a time difference (t−t0) and a correction coefficient k, and the correction coefficient k is a preset fixed value.

16 Claims, 3 Drawing Sheets

(51) Int. Cl.
  *D06F 39/08* (2006.01)
  *D06F 33/00* (2020.01)
(52) U.S. Cl.
  CPC ...... *D06F 2202/02* (2013.01); *D06F 2202/08* (2013.01); *D06F 2204/086* (2013.01); *D06F 2210/00* (2013.01); *D06F 2212/02* (2013.01)

(56) References Cited

U.S. PATENT DOCUMENTS

| | | | |
|---|---|---|---|
| 2005/0067049 A1* | 3/2005 | Fima | F24H 9/2007 141/192 |
| 2005/0235306 A1* | 10/2005 | Fima | E03B 1/00 725/10 |
| 2014/0123400 A1* | 5/2014 | Gasparini | D06F 39/087 8/137 |
| 2017/0175317 A1* | 6/2017 | Kim | D06F 33/00 |
| 2017/0226680 A1* | 8/2017 | Driussi | D06F 39/087 |

OTHER PUBLICATIONS

International Search Report (PCT/ISA/210) dated May 3, 2017, by the Chinese Patent Office as the International Searching Authority for International Application No. PCT/CN2017/072139.
Written Opinion (PCT/ISA/237) dated May 3, 2017, by the Chinese Patent Office as the International Searching Authority for International Application No. PCT/CN2017/072139.

\* cited by examiner

METHOD FOR MONITORING WATER CONSUMPTION OF WASHING MACHINE, WASHING MACHINE, AND WASHING MACHINE SYSTEM

FIELD OF THE DISCLOSURE

The present disclosure relates to the technical field of detecting water consumption and power consumption of washing machines, and specifically relates to a method for monitoring water consumption of a washing machine, a washing machine and a washing machine system.

BACKGROUND OF THE DISCLOSURE

Existing drum washing machines and fully automatic washing machines do not have the function of detecting water consumption for washing clothes. A user cannot know the water consumption for washing clothes after the end of washing with a clothes washing procedure. Users' understanding of washing machines is still limited to the states of washing time, washing procedure, washing water temperature, washing water level and the like of the washing machine. To help the users to know more deeply about the washing machines and cultivate the users' water saving habits, it is necessary to add the detection of water consumption for washing clothes to the washing machines.

Existing methods for detecting water consumption of a washing machine mainly use a flow meter or other detection device to detect the water consumption of the washing machine. Although the water consumption of the washing machine can be detected more accurately in this way, the washing machine needs to be added with corresponding hardware devices and relevant electric circuits to so as to meet the corresponding requirement, which adds much cost to the washing machine, and leads to low cost performance in view of user experience and cost increase of the washing machine.

In addition, even if an existing washing machine can acquire water consumption in a clothes washing process, it is generally just displayed simply on a display panel of the washing machine, and the user generally does not seek to acquire the water consumption. Even if the user acquires the water consumption once, he can only obtain the water consumption this time, but cannot know the long-term water consumption and the use of the washing machine. Thus, this is not actually worthy of use.

The present disclosure is made in view of this.

SUMMARY OF THE DISCLOSURE

To solve the above problems, a first disclosure object of the present disclosure is to provide a method for monitoring water consumption of a washing machine, specifically adopting the following technical solution:

The method for monitoring water consumption of a washing machine includes:

the washing machine executing a clothes washing procedure and receiving a water level setting instruction;

the washing machine executing the clothes washing procedure and acquiring opening time t of a water intake valve from start to end;

the washing machine calculating the water intake flow of the water intake valve $Q=Q_0+\Delta Q$, and calculating the water consumption $W=Qt$;

wherein with a normal water pressure and no load, when the water intake of the washing machine reaches the level, the theoretical flow value is $Q_0$, the theoretical water intake time is t0, $\Delta Q$ is a flow correction value, $\Delta Q$ is calculated from a time difference (t−t0) and a correction coefficient k, and the correction coefficient k is a preset fixed value.

Further, the flow correction value $\Delta Q$ satisfies $$\Delta Q = \pm \sqrt{\frac{k}{|t - t_0|}},$$

wherein when t>t0, $\Delta Q$ is positive; when t=t0, $\Delta Q$=0; and when t<t0, $\Delta Q$ is negative;

wherein the correction coefficient k is a fixed constant, depending on the water intake pressure and the area of a water inlet.

Further, the correction coefficient $k=k1*k2$;
said $$k_1 = \frac{2*\mu*A}{\rho},$$

wherein $\mu$ is a flow coefficient, related to the shape of the valve or the pipe, A is the cross sectional area of the water inlet, and $\rho$ is the density of fluid;

said k2 can be calculated by testing with the water intake time t corresponding to different water pressures in a no-load state at a set water level.

Further, the water intake of the washing machine involves multiple set water levels x, each of which corresponds to multiple water intake stages y, and the water consumption after turning off of the washing machine or after the end of washing clothes is the sum of the water consumption of all stages, and the water consumption for washing clothes is calculated according to the formula $W=Qx1*Tx1+Qx2*Tx2+Qx3*Tx3+ \ldots +Qxy*Txy$ (Qxy represents the flow of the water intake stage y corresponding to the set water level x, and Txy represents the opening time of all the water intake valves in the water intake stage y at the set water level x).

Further, the washing machine obtains the corresponding corrected water intake flow Q11, Q12, Q13, . . . , Qxy of the water intake stages according to a calculation formula;

said $Qxy=Qx0+\Delta Qxy$, wherein Qx0 represents the theoretical flow value when the water intake of the washing machine reaches the set water level x with a normal water pressure and no load, and $\Delta Qxy$ represents a deviation of the water intake flow of the water intake stage y at the set water level x.

Further, the washing machine comprises multiple water intake valves, and the opening time of each water intake valve is calculated (txy1, txy2, txy3, . . . , txyz), and the opening time of the water intake valves in each water intake stage is $Txy=txy1+txy2+txy3+ \ldots +txyz$ (txyz represents the opening time of the zth water intake valve in the yth stage at the set water level x).

Said $$\Delta Q_{xy} = \pm \sqrt{\frac{k}{|T_{xy} - T_{xy0}|}},$$

wherein Txy0 represents the theoretical water intake time for the water intake of the washing machine to reach the set water level x at the water intake stage y with a normal water pressure and no load, wherein when Txy>Txy0, ΔQxy is positive; when Txy=Txy0, ΔQxy=0; and when Txy<Txy0, ΔQxy is negative.

Further, the set water level x∈[1, 12], the water intake stage y is related to the number of rinsing time(s) selected by a user, and the water intake stage y∈[1, 10].

Further, after the last rinsing, the rinsing water is detected whether or not it can be recycled, and if yes, the washing machine excludes the water consumption of the last rinsing from the calculation of the water consumption.

A second object of the present disclosure is to provide a washing machine using the method for monitoring water consumption of a washing machine. The washing machine comprises a water intake valve and a timing module, the timing module recording the working time of the water intake valve, and the washing machine acquiring the time recorded by the timing module and calculating the water intake flow of the water intake valve according to the formula $Q=Q_0+\Delta Q$ and calculating the water consumption $W=Qt$.

Wherein, with a normal water pressure and no load, when the water intake of the washing machine reaches the water level, the theoretical flow value is $Q_0$, the theoretical water intake time is t0, ΔQ is a flow correction value, ΔQ is calculated from a time difference (t−t0) and a correction coefficient k, and the correction coefficient k is a preset fixed value.

A third object of the present disclosure is to provide a washing machine system with the washing machine, wherein the washing machine is in communication connection with an intelligent terminal through a cloud platform server.

The washing machine executing a clothes washing procedure and calculating water consumption for washing clothes this time according to accumulative water intake time from the start to the end of washing clothes;

the washing machine sending the calculated water consumption to the cloud platform server; and the cloud platform server pushing the water consumption to the corresponding intelligent terminal.

The method for monitoring water consumption of a washing machine in the present disclosure is provided in light of avoiding a cost increase, and water intake stages and water intake characteristics during working of the washing machine are analyzed by mainly using corresponding calculation methods to calculate the water consumption in the clothes washing process of the washing machine; and the calculation result of the water consumption of the washing machine of the present disclosure substantially conforms to data obtained by detection using a flow meter. Therefore, the calculation method of the water consumption in the present disclosure leads to a relatively accurate calculation result and ensures that the calculation of the water consumption of the washing machine can be within an error allowable range.

The method for monitoring water consumption of a washing machine in the present disclosure achieves accurate detection of the water consumption of the washing machine without increasing the cost, and displays the calculated water consumption value to the user so that the user visually obtains power consumption information, which facilitates developing a good habit of washing machine usage and saving water.

BRIEF DESCRIPTION OF THE DRAWINGS

FIG. 1 is a flow diagram of a method for monitoring water consumption of a washing machine in embodiment 1 of the present disclosure.

DETAILED DESCRIPTION OF THE EMBODIMENTS

A method for monitoring water consumption of a washing machine, a washing machine and a washing machine system of the present disclosure are described in detail below in conjunction with the accompanying drawings:

A method for monitoring water consumption of a washing machine in the embodiment includes:

the washing machine executing a clothes washing procedure and receiving a water level setting instruction;

the washing machine executing the clothes washing procedure and acquiring opening time t of a water intake valve from start to end;

the washing machine calculating the water intake flow of the water intake valve $Q=Q_0+\Delta Q$, and calculating the water consumption $W=Qt$.

Wherein, with a normal water pressure and no load, when the water intake of the washing machine reaches the level, the theoretical flow value is $Q_0$, the theoretical water intake time is t0, ΔQ is a flow correction value, ΔQ is calculated from a time difference (t−t0) and a correction coefficient k, and the correction coefficient k is a preset fixed value.

First, under the normal water pressure $P_0$, time t0 for the water intake to reach a set water level $L_0$ is recorded, wherein the water volume corresponding to the set water level is V0, the water volume V0 is obtained by testing with no load on the washing machine, and the corresponding water intake flow Q0 is equal to V0/t0. When clothes are contained in the washing machine, as different water pressures can influence the water intake flow, the water intake flow needs to be modified or increased according to the magnitude of the water pressure.

In the method for monitoring water consumption of a washing machine in the embodiment, the opening time t of the water intake valve is detected, the water consumption of the washing machine is calculated by using the formula W=Qt, wherein the flow Q of the water intake value is based on the theoretical flow value $Q_0$ when the water intake of the washing machine reaches the water level with a normal water pressure and no load. The water intake flow correction value ΔQ is obtained in view of the influent water pressure and structural characteristics of the water intake valve; and finally the actual water intake flow of the water intake valve is finally calculated by the formula $Q=Q_0+\Delta Q$. Thus, the method for monitoring water consumption of a washing machine in the present disclosure is more adapted to the actual working conditions of the water intake valve, and the calculated water intake flow Q is more accurate with little difference from a value measured by a flow meter, so that the water consumption calculated by using the method for monitoring water consumption of a washing machine in the present disclosure is within an error range, and the calculation result is reliable and is worthy of reference.

As the washing machine generally comprises multiple water intake levels, each of which corresponds to a set of theoretical flow value Q0 and theoretical water intake time t0, in the present disclosure, there are multiple sets of theoretical flow values Q0 and theoretical water intake time t0, and when a set water level is selected, a corresponding set of theoretical flow values Q0 and theoretical water intake time t0 are also selected.

Further, the flow correction value ΔQ of the embodiment satisfies $$\Delta Q = \pm \sqrt{\frac{k}{|t - t_0|}},$$

wherein when t>t0, ΔQ is positive; when t=t0, ΔQ=0; and when t<t0, ΔQ is negative.

Wherein the correction coefficient k is a fixed constant, depending on the water intake pressure and the area of a water inlet.

Specifically, the correction coefficient k in the embodiment is equal to k1*k2; said $$k_1 = \frac{2 * \mu * A}{\rho},$$

wherein μ is a flow coefficient, related to the shape of the valve or pipe, A is the cross sectional area of the water inlet, and ρ is the density of fluid.

The k2 can be calculated by testing with the water intake time t corresponding to different water pressures in a no-load state at a set water level.

If the set water level is determined, the water intake flow and water intake time corresponding to different water pressures are different, and the relation between the flow rate, flow velocity, cross sectional area, and water pressure of the water intake valve is: $Q=\sqrt{\mu*A*(2*P/\rho)}=A*V$, wherein μ is a flow coefficient related to the shape of the valve or pipe, generally within the range of 0.6-0.65; A is the cross sectional area of the water pipe in m²; P is a difference of pressures before and after passing the valve in Pa, and P=P1−P2, where P1 is the water pressure, and P2 is the standard atmospheric pressure; ρ is the fluid density in Kg/m³; and v is the flow velocity. According to the above relational expression, the influent water pressure is directly proportional to the flow, i.e. $Q^2=k_1*P$, where k1 can be calculated according to relevant parameters of a water tap.

When the water level is set to a determined value with no load on the washing machine, the influent water pressure is inversely proportional to the water intake time, i.e. P=k2/t; and as it is measured by testing with no load, different water pressures correspond to different time, and k2 can be obtained by testing with experimental data, thus $Q^2=k/t$, k=k1*k2, and $$\Delta Q = \pm \sqrt{\frac{k}{|t - t_0|}},$$

wherein when t>t0, ΔQ is positive; when t=t0, ΔQ=0, and when t<t0, ΔQ is negative.

Therefore, factors influencing water intake are fully taken into account in the calculation of the water intake flow Q in the embodiment, and the theoretical value is further corrected to be closer to the actual water intake flow, thus ensuring the accuracy of the calculation of the water consumption.

The water intake of the washing machine in the embodiment involves multiple set water levels x, each of which corresponds to multiple water intake stages y, and the water consumption after turning off of the washing machine or after the end of washing clothes is the sum of the water consumption of the stages, and the water consumption for washing clothes is calculated according to the formula W=Qx1*Tx1+Qx2*Tx2+Qx3*Tx3+ . . . +Qxy*Txy (Qxy represents the flow of the water intake stage y corresponding to the set water level x, and Txy represents the opening time of all the water intake valves in the water intake stage y at the set water level x).

The washing machine in the embodiment generally includes a washing water intake stage and a rinsing water intake stage, and may also include water intake during spraying water intake, main water intake, softening water intake and other processes. Thus, in the method for monitoring water consumption of a washing machine in the embodiment, the water intake is divided into multiple water intake stages according to actual working conditions, and calculation is performed for each stage, which can maximally reduce the error. In addition, the water intake quantity of the corresponding water intake stage can be selected for calculation according to the type of the washing machine or the procedure selection of the washing machine, which is more conducive to the calculation of the water consumption in an actual working state.

Further, the washing machine of the embodiment obtains the corresponding corrected water intake flow Q11, Q12, Q13, . . . , Qxy of the water intake stages according to a calculation formula;

said Qxy=Qx0+ΔQxy, wherein Qx0 represents the theoretical flow value Q0 when the water intake of the washing machine reaches the set water level x with a normal water pressure and no load, and ΔQxy represents a deviation of the water intake flow of the water intake stage y at the set water level x.

Further, the washing machine comprises multiple water intake valves, and the opening time of each water intake valve is calculated (txy1, txy2, txy3, . . . , txyz), and the opening time of the water intake valves in each water intake stage is Txy=txy1+txy2+txy3+ . . . +txyz (txyz represents the opening time of the zth water intake valve in the yth stage at the set water level x);

said $$\Delta Q_{xy} = \pm \sqrt{\frac{k}{|T_{xy} - T_{xy0}|}},$$

wherein Txy0 represents the theoretical water intake time for the water intake of the washing machine to reach the set water level x at the water intake stage y with a normal water pressure and no load, wherein when Txy>Txy0, ΔQxy is positive; when Txy=Txy0, ΔQxy=0; and when Txy<Txy0, ΔQxy is negative.

The number of water intake valves is further considered in the embodiment and calculation is performed separately for each water intake valve to avoid an error increase; meanwhile, calculation can be performed for the water intake valve(s) working in the actual clothes washing procedure, to achieve higher flexibility, greater adaptability, and a more accurate calculation result.

In the embodiment, the set water level x∈[1, 12], the water intake stage y is related to the number of rinsing time(s) selected by a user, the water intake stage y∈[1, 10], and specifically, the value ranges of x and y are related to the number of rinsing time(s) selected by the user.

Figure 1:
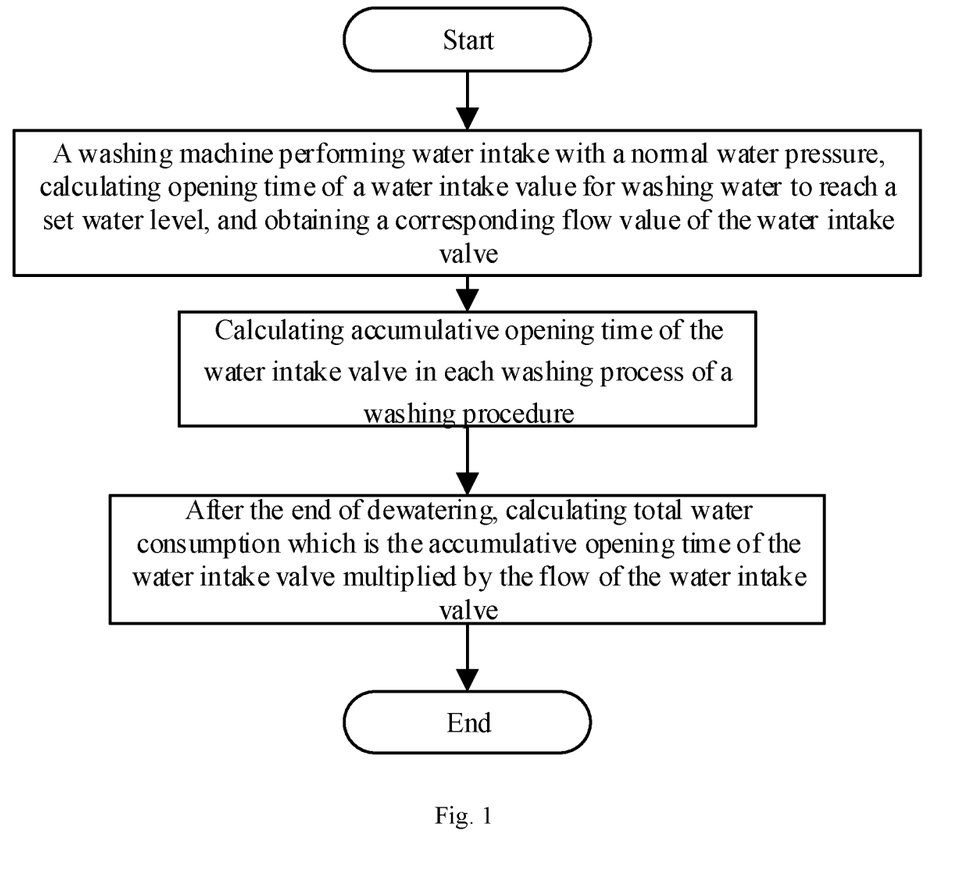
FIG. 1 is a flow diagram of a method for monitoring water consumption of a washing machine in an embodiment of the present disclosure.

The method for monitoring water consumption of a washing machine in the embodiment is show in FIG. 1.

The embodiment provides a washing machine using the method for monitoring water consumption of a washing machine, the washing machine including a water intake valve and a timing module, the timing module recording the working time of the water intake valve, and the washing machine acquiring the time recorded by the timing module and calculating the water intake flow of the water intake valve according to the formula $Q=Q_0+\Delta Q$ and calculating the water consumption $W=Qt$.

Wherein with a normal water pressure and no load, when the water intake of the washing machine reaches the level, the theoretical flow value is $Q0$, the theoretical water intake time is $t0$, $\Delta Q$ is a flow correction value, $\Delta Q$ is calculated from a time difference $(t-t0)$ and a correction coefficient k, and the correction coefficient k is a preset fixed value.

The washing machine of the embodiment achieves accurate detection of the water consumption of the washing machine without increasing the cost, and displays the calculated water consumption value to the user so that the user visually obtains power consumption information, which facilitates developing a good habit of washing machine usage and saving water.

Figure 3:
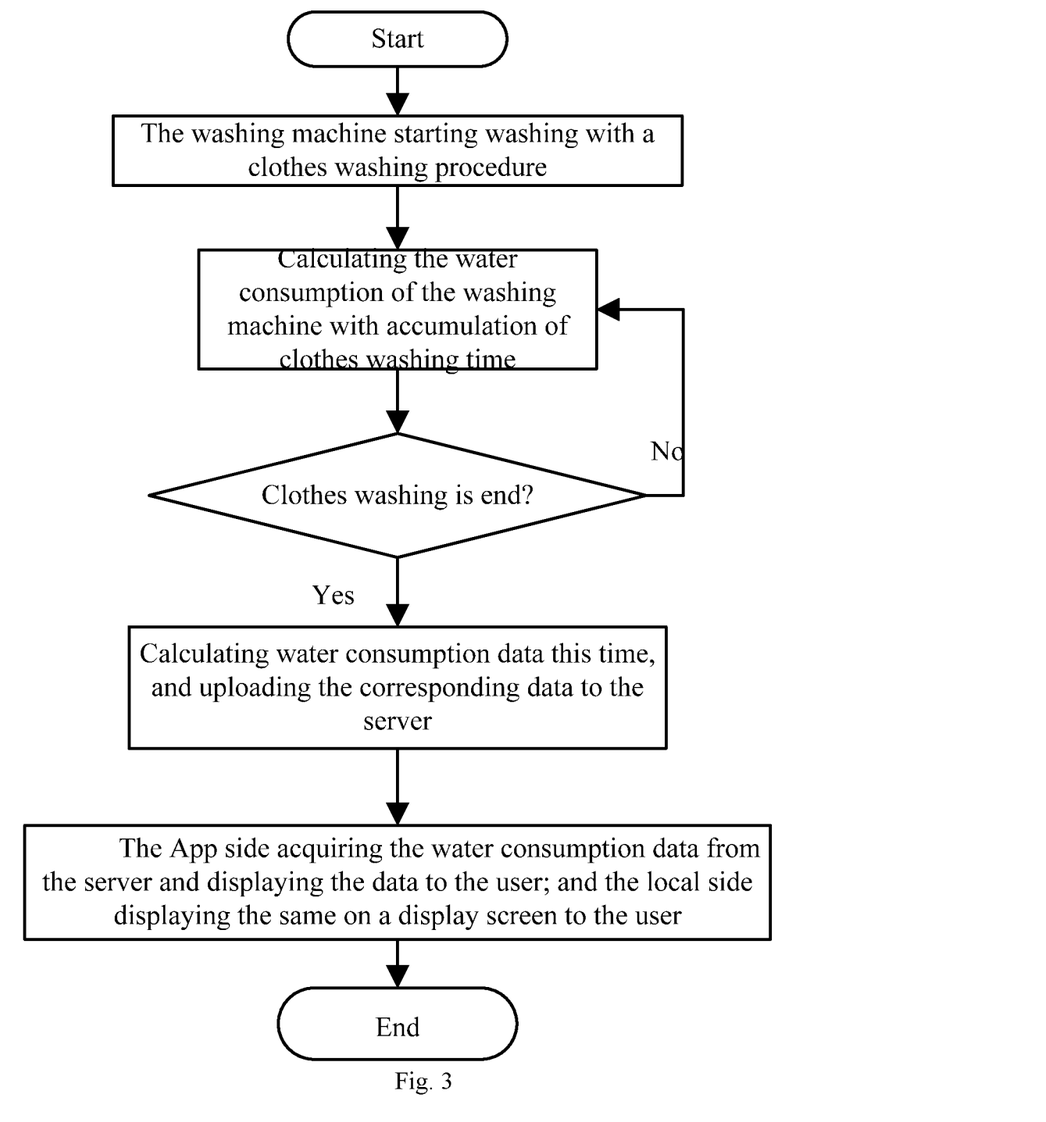
FIG. 3 is a flow diagram of monitoring water consumption of a washing machine in an embodiment of the present disclosure.

As shown in FIG. 3, in a washing machine system with the washing machine in the embodiment, the washing machine is in communication connection with an intelligent terminal through a cloud platform server;

the washing machine executes a clothes washing procedure and calculates water consumption for washing clothes this time according to accumulative water intake time from the start to the end of washing clothes;

the washing machine sends the calculated water consumption to the cloud platform server; and the cloud platform server pushes the water consumption to the corresponding intelligent terminal.

In the washing machine system of the embodiment, after the end of operation of the selected procedure, the water consumption generated by the operation this time is calculated, and transmitted to the cloud platform server via a network, then the cloud platform server transmits the data to the mobile terminal, and a display interface of the mobile terminal presents the data to the user or transmits the data to the user by means of a voice or the like.

The washing machine system of the embodiment facilitates the cloud platform server transmitting water consumption information of the user on the one hand, and facilitates storage of the information on the other hand. In addition, the cloud platform server can push a relevant water saving method based on actual use by the user, so as to facilitate reference by the user.

The washing machine system of the embodiment displays the calculated water consumption value to the user so that the user directly obtains power consumption information, which facilitates developing a good habit of washing machine usage and saving water.

In addition, it needs to the further noted that the washing machine of the embodiment may also have on the local side a display module capable of displaying water consumption, and after calculating the water consumption, the washing machine can directly display it on the display module.

Further, after calculation of the water consumption in each washing stage of the clothes washing procedure is finished, the display module can display it to facilitate the user seeing the water consumption in each washing stage.

Embodiment 1

Figure 2:
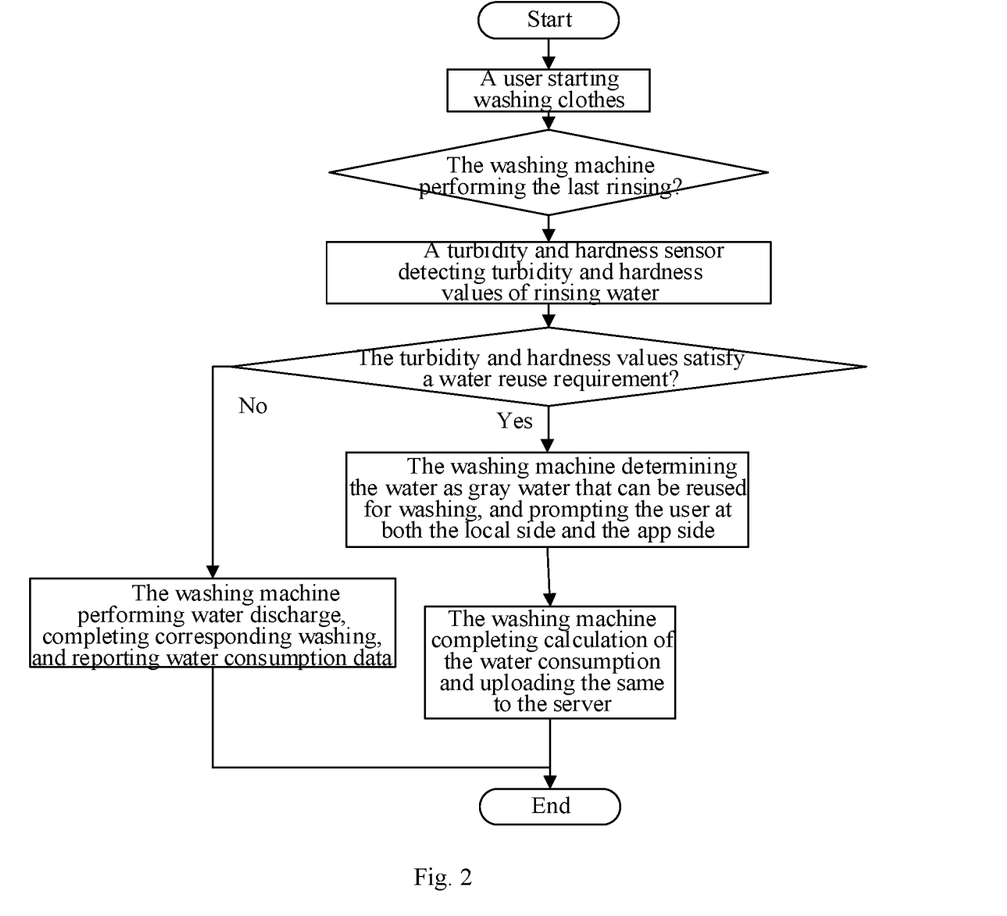

As shown in FIG. 2, the washing machine of the embodiment has a water reuse function, and in the method for monitoring water consumption of a washing machine, after the last rinsing, the washing machine detects whether rinsing water can be recycled or not, and if yes, the washing machine excludes the water consumption of the last rinsing from the calculation of the water consumption.

The method for monitoring a washing machine in the embodiment is directed to the working manner of the washing machine with the water reuse function, and the influence of water reuse on water consumption is fully considered, so that the calculation result is more accurate.

The method for monitoring water consumption of a washing machine in the embodiment includes:

the washing machine starting washing clothes;

a turbidity and hardness sensor monitoring turbidity and hardness values of rinsing water after the washing machine performs the last rinsing;

determining whether the monitored turbidity and hardness values satisfy water reuse requirements;

if the determination result is yes, the washing machine determining the water as gray water that can be reused for washing, prompting the user at both the local side and the app side, and the washing machine completing calculation of the water consumption and uploading the same to the cloud platform server; and if the determination result is no, the washing machine performing water discharge, and after finishing washing clothes, calculating the water consumption and uploading the same to the cloud platform server.

Described above are just preferred embodiments of the present disclosure, rather than limitations to the present disclosure in any form. The present disclosure has been disclosed above with the preferred embodiments, which are however not intended to limit the present disclosure. Any technical person familiar with the patent can make some alterations or modifications to form equivalent embodiments with equivalent changes using the technical contents indicated above without departing from the scope of the technical solutions of the present disclosure. All simple alterations, equivalent changes and modifications made to the above embodiments based on the technical essence of the present disclosure without departing from the contents of the technical solutions of the present disclosure should still be encompassed within the scope of the solutions of the present disclosure.

The invention claimed is:

1. A method for monitoring water consumption of a washing machine, comprising:

the washing machine executing a clothes washing procedure and receiving a setting instruction of a water level;

the washing machine executing the clothes washing procedure and acquiring an opening time t of a water intake valve from start to end;

the washing machine calculating a water intake flow of the water intake valve $Q=Q_0+\Delta Q$, and calculating a water consumption $W=Qt$;

wherein with a normal water pressure and no load, when a water intake of the washing machine reaches the water level, a theoretical flow value is $Q_0$, a theoretical water intake time is $t0$, $\Delta Q$ is a flow correction value, $\Delta Q$ is calculated from a time difference $(t-t0)$ and a correction coefficient k, and the correction coefficient k is a preset fixed value.

2. The method for monitoring water consumption of the washing machine according to claim 1, wherein the flow correction value $\Delta Q$ satisfies $$\Delta Q = \pm \sqrt{\frac{k}{|t - t_0|}},$$

when $t > t0$, $\Delta Q$ is positive; when $t = t0$, $\Delta Q = 0$; and when $t < t0$, $\Delta Q$ is negative;
wherein the correction coefficient k is a fixed constant, depending on a water intake pressure and an area of a water inlet.

3. The method for monitoring water consumption of the washing machine according to claim 2, wherein the correction coefficient $k = k1 * k2$;
wherein $$k_1 = \frac{2 * \mu * A}{\rho},$$

$\mu$ is a flow coefficient, related to a shape of a valve or a pipe, A is a cross-sectional area of the water inlet, and $\rho$ is a density of fluid;
k2 is calculated by testing with the water intake time t corresponding to different water pressures in a no-load state at a set water level.

4. The method for monitoring water consumption of the washing machine according to claim 2, wherein the water intake of the washing machine involves multiple set water levels x, each set water level corresponds to multiple water intake stages y, and the water consumption after turning off of the washing machine or after an end of washing clothes is a sum of the water consumption of all stages, and
the water consumption for washing clothes is calculated according to a formula $W = Qx1*Tx1 + Qx2*Tx2 + Qx3*Tx3 + \ldots + Qxy*Txy$, Qxy represents a flow of a water intake stage y corresponding to a set water level x, and Txy represents all the opening time of the water intake valve in the water intake stage y at the set water level x.

5. A washing machine using the method for monitoring water consumption of the washing machine according to claim 2, wherein the washing machine comprises a water intake valve and a timing module, the timing module records a working time of the water intake valve, and the washing machine acquires a time recorded by the timing module and calculates the water intake flow of the water intake valve according to the formula $Q = Q_0 + \Delta Q$, and calculates the water consumption $W = Qt$;
wherein with the normal water pressure and no load, when the water intake of the washing machine reaches the water level, the theoretical flow value is $Q_0$, the theoretical water intake time is t0, $\Delta Q$ is a flow correction value, $\Delta Q$ is calculated from a time difference (t−t0) and a correction coefficient k, and the correction coefficient k is a preset fixed value.

6. The method for monitoring water consumption of the washing machine according to claim 1, wherein the correction coefficient $k = k1 * k2$;
wherein $$k_1 = \frac{2 * \mu * A}{\rho},$$

$\mu$ is a flow coefficient, related to a shape of a valve or a pipe, A is a cross-sectional area of the water inlet, and $\rho$ is a density of fluid;
k2 is calculated by testing with the water intake time t corresponding to different water pressures in a no-load state at a set water level.

7. The method for monitoring water consumption of the washing machine according to claim 6, wherein the water intake of the washing machine involves multiple set water levels x, each set water level corresponds to multiple water intake stages y, and the water consumption after turning off of the washing machine or after an end of washing clothes is a sum of the water consumption of all stages, and
the water consumption for washing clothes is calculated according to a formula $W = Qx1*Tx1 + Qx2*Tx2 + Qx3*Tx3 + \ldots + Qxy*Txy$, Qxy represents a flow of a water intake stage y corresponding to a set water level x, and Txy represents all the opening time of the water intake valve in the water intake stage y at the set water level x.

8. A washing machine using the method for monitoring water consumption of the washing machine according to claim 6, wherein the washing machine comprises a water intake valve and a timing module, the timing module records a working time of the water intake valve, and the washing machine acquires a time recorded by the timing module and calculates the water intake flow of the water intake valve according to the formula $Q = Q_0 + \Delta Q$, and calculates the water consumption $W = Qt$;
wherein with the normal water pressure and no load, when the water intake of the washing machine reaches the water level, the theoretical flow value is $Q_0$, the theoretical water intake time is t0, $\Delta Q$ is a flow correction value, $\Delta Q$ is calculated from a time difference (t−t0) and a correction coefficient k, and the correction coefficient k is a preset fixed value.

9. The method for monitoring water consumption of the washing machine according to claim 1, wherein the water intake of the washing machine involves multiple set water levels x, each set water level corresponds to multiple water intake stages y, and the water consumption after turning off of the washing machine or after an end of washing clothes is a sum of the water consumption of all stages, and
the water consumption for washing clothes is calculated according to a formula $W = Qx1*Tx1 + Qx2*Tx2 + Qx3*Tx3 + \ldots + Qxy*Txy$, Qxy represents a flow of a water intake stage y corresponding to a set water level x, and Txy represents all the opening time of the water intake valve in the water intake stage y at the set water level x.

10. The method for monitoring water consumption of the washing machine according to claim 9, wherein the washing machine obtains correspondingly corrected water intake flows Q11, Q12, Q13, . . . , Qxy of the water intake stages according to a calculation formula;
wherein $Qxy = Qx0 + \Delta Qxy$, Qx0 represents the theoretical flow value when the water intake of the washing machine reaches the set water level x with the normal water pressure and no load, and $\Delta Qxy$ represents a deviation of the water intake flow of the water intake stage y at the set water level x.

11. The method for monitoring water consumption of the washing machine according to claim 9, wherein the washing machine comprises multiple water intake valves, and the opening time of each water intake valve is calculated (txy1, txy2, txy3, . . . , txyz), and the opening time of the water intake valves in each water intake stage is $Txy = txy1 + txy2 +$ txy3+ . . . +txyz, txyz represents the opening time of the zth water intake valve in the yth stage at the set water level x; wherein $$\Delta Q_{xy} = \pm \sqrt{\frac{k}{|T_{xy} - T_{xy0}|}},$$

Txy0 represents the theoretical water intake time for the water intake of the washing machine to reach the set water level x at the water intake stage y with the normal water pressure and no load, when Txy>Txy0, ΔQxy is positive; when Txy=Txy0, ΔQxy=0; and when Txy<Txy0, ΔQxy is negative.

12. The method for monitoring water consumption of the washing machine according to claim 9, wherein the set water level x∈[1, 12], the water intake stage y is related to a number of rinsing time(s) selected by a user, and the water intake stage y∈[1, 10].

13. A washing machine using the method for monitoring water consumption of the washing machine according to claim 9, wherein the washing machine comprises a water intake valve and a timing module, the timing module records a working time of the water intake valve, and the washing machine acquires a time recorded by the timing module and calculates the water intake flow of the water intake valve according to the formula Q=Q$_0$+ΔQ, and calculates the water consumption W=Qt;

wherein with the normal water pressure and no load, when the water intake of the washing machine reaches the water level, the theoretical flow value is Q$_0$, the theoretical water intake time is t0, ΔQ is a flow correction value, ΔQ is calculated from a time difference (t−t0) and a correction coefficient k, and the correction coefficient k is a preset fixed value.

14. The method for monitoring water consumption of the washing machine according to claim 1, wherein after a last rinsing, the washing machine detects whether rinsing water can be recycled or not, and if yes, the washing machine excludes the water consumption of the last rinsing from calculating the water consumption.

15. A washing machine using the method for monitoring water consumption of the washing machine according to claim 1, wherein the washing machine comprises a water intake valve and a timing module, the timing module records a working time of the water intake valve, and the washing machine acquires a time recorded by the timing module and calculates the water intake flow of the water intake valve according to the formula Q=Q$_0$+ΔQ, and calculates the water consumption W=Qt;

wherein with the normal water pressure and no load, when the water intake of the washing machine reaches the water level, the theoretical flow value is Q$_0$, the theoretical water intake time is t0, ΔQ is a flow correction value, ΔQ is calculated from a time difference (t−t0) and a correction coefficient k, and the correction coefficient k is a preset fixed value.

16. A washing machine system with the washing machine according to claim 15, wherein the washing machine is in communication connection with an intelligent terminal through a cloud platform server;

the washing machine executes a clothes washing procedure and calculates the water consumption for washing clothes this time according to accumulative water intake time from start to end of washing clothes;

the washing machine sends the water consumption calculated to the cloud platform server; and the cloud platform server pushes the water consumption to the corresponding intelligent terminal.

* * * * *